(12) United States Patent
Yoo et al.

(10) Patent No.: US 9,124,826 B2
(45) Date of Patent: Sep. 1, 2015

(54) IMAGE SENSING DEVICE AND METHOD FOR OPERATING THE SAME

(71) Applicant: SK hynix Inc., Gyeonggi-do (KR)

(72) Inventors: Si-Wook Yoo, Gyeonggi-do (KR); Won-Seok Hwang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 6 days.

(21) Appl. No.: 14/052,431

(22) Filed: Oct. 11, 2013

(65) Prior Publication Data
US 2014/0354866 A1    Dec. 4, 2014

(30) Foreign Application Priority Data
May 30, 2013    (KR) .................... 10-2013-0061400

(51) Int. Cl.
H04N 5/347    (2011.01)
H04N 5/374    (2011.01)
H04N 9/04    (2006.01)

(52) U.S. Cl.
CPC ................ *H04N 5/347* (2013.01); *H04N 9/045* (2013.01)

(58) Field of Classification Search
CPC .......... H04N 5/347; H04N 5/374; H04N 9/04
USPC ............ 348/302, 294, 308, 229.1; 250/208.1; 257/291, 292
See application file for complete search history.

(56) References Cited

U.S. PATENT DOCUMENTS

| | | | |
|---|---|---|---|
| 6,452,153 B1* | 9/2002 | Lauxtermann et al. | 250/208.1 |
| 6,878,918 B2* | 4/2005 | Dosluoglu | 250/208.1 |
| 7,154,075 B2* | 12/2006 | Krymski | 250/208.1 |
| 7,705,900 B2* | 4/2010 | Guidash | 348/308 |
| 7,859,581 B2* | 12/2010 | Guidash | 348/302 |
| 8,546,737 B2* | 10/2013 | Tian et al. | 250/208.1 |
| 9,001,251 B2* | 4/2015 | Smith et al. | 348/302 |
| 2002/0191828 A1* | 12/2002 | Colbeth et al. | 382/132 |
| 2005/0133687 A1* | 6/2005 | Bock | 250/208.1 |
| 2010/0328505 A1* | 12/2010 | Imamura | 348/273 |
| 2012/0006972 A1* | 1/2012 | Yoo | 250/208.1 |
| 2012/0112040 A1* | 5/2012 | Cho | 250/208.1 |
| 2012/0112041 A1* | 5/2012 | Cho | 250/208.1 |
| 2012/0281121 A1* | 11/2012 | Kim | 348/241 |
| 2014/0285706 A1* | 9/2014 | Theuwissen | 348/350 |

FOREIGN PATENT DOCUMENTS

KR    1020120045811    5/2012

\* cited by examiner

*Primary Examiner* — Lin Ye
*Assistant Examiner* — Marly Camargo
(74) *Attorney, Agent, or Firm* — IP & T Group LLP

(57) ABSTRACT

An image sensing device includes a plurality of pixels arranged in rows and columns and a sampling unit suitable for sampling the plurality of pixels in units of M by N in a binning mode, M and N being a positive integer greater than 2.

14 Claims, 5 Drawing Sheets

IMAGE SENSING DEVICE AND METHOD FOR OPERATING THE SAME

CROSS-REFERENCE TO RELATED APPLICATIONS

The present application claims priority of Korean Patent Application No. 10-2013-0061400, filed on May 30, 2013, which is incorporated herein by reference in its entirety.

BACKGROUND

1. Field

Exemplary embodiments of the present invention relate to a semiconductor design technology, and, more particularly, to an image sensing device and a method for operating the same capable of supporting a binning mode.

2. Description of the Related Art

Recently, the demand for digital cameras has explosively increased with the development of visual communication using the Internet. Moreover, as mobile communication terminals mounted with a camera, such as a personal digital assistant (PDA), an International Mobile Telecommunications-2000 (IMT-2000) terminal, and a code division multiple access (CDMA) terminal have become popular, the demand for small-sized camera modules has increased.

A camera module basically includes an image sensor. In general, an image sensor refers to a device which converts an optical image into an electrical signal. A charge coupled device (CCD) and a complementary metal oxide semiconductor (CMOS) image sensor are also widely used as an image sensor.

The CCD has a complicated driving scheme and high power consumption. Furthermore, since the number of mask processes is relatively large in the fabrication thereof, processing may be complex. In addition, since a signal processing circuit may not be realized in a chip, it may be difficult to realize the CCD in one chip. In the CMOS image sensor, however, the monolithic integration of control, driving, and signal processing circuits in a single chip is possible. Accordingly, attention has recently been paid on the CMOS image sensor. Also, the CMOS image sensor latently incurs a low cost due to a low voltage operation, low power consumption, compatibility with peripheral devices and the efficiency of a standard CMOS fabrication process when compared to the existing CCD.

Meanwhile, the number of pixels in the image sensor, i.e., a resolution, may be increased according to the development of technology, and the increased resolution may induce the amount of data to be processed. Accordingly, the image sensor supports a binning mode. In the binning mode, an image may be formed based on single information, which is collected by summing information of neighboring pixels, not by summing information of all pixels provided in the image sensor.

SUMMARY

Various exemplary embodiments are directed to an image sensing device and a method of operating the same, capable of simultaneously performing a column binning operation and a row binning operation in a binning mode.

In an exemplary embodiment, an image sensing device may include a plurality of pixels arranged in rows and columns and a sampling unit suitable for sampling the plurality of pixels in units of M by N in a binning mode, M and N being a positive integer greater than 2.

In an exemplary embodiment, an image sensing device may include first and second column lines, each coupled to a plurality of unit pixels; a column binning unit suitable for performing a column binning on a plurality of unit pixel signals, which are sequentially outputted from the first and second column lines, in a basis of rows in a binning mode; and a row binning unit suitable for performing a row binning on a plurality of column binning signals outputted from the column binning unit in the binning mode.

In an exemplary embodiment, an image sensing device may include a first column line coupled to a first unit pixel arranged in a first row, and a second unit pixel arranged in a second row; a second column line coupled to a third unit pixel arranged in the first row, and a fourth unit pixel arranged in the second row; a column average unit suitable for averaging first and second unit pixel signals sequentially outputted from the first column line and third and fourth unit pixel signals sequentially outputted from the second column line in a basis of rows, and outputting first and second column average signal in a binning mode; first and second storage units suitable for storing the first and second column average signals, respectively, in the binning mode; a row binning unit suitable for summing first and second column storage signals stored in the first and second storage units and outputting a sampling signal in the binning mode; and a gain adjusting unit suitable for amplifying the sampling signal within a preset gain range.

In an exemplary embodiment, an image sensing device may include a first column line coupled to a first unit pixel arranged in a first row, and a second unit pixel arranged in a second row; a second column line coupled to a third unit pixel arranged in the first row, and a fourth unit pixel arranged in the second row; a first resistance unit coupled between the first column line and an average output node, suitable for reflecting a preset resistance on first and second unit pixel signals based on a binning enable signal; a second resistance unit coupled between the second column line and the average output node, suitable for reflecting a preset resistance on third and fourth unit pixel signals based on the binning enable signal; a first storage unit suitable for storing a first column average signal outputted from the average output node based on a common storage control signal; a first path unit suitable for providing a path of the first column average signal between the average output node and the first storage unit based on a first column binning signal; a second storage unit suitable for storing a second column average signal outputted from the average output node based on the common storage control signal; a second path unit suitable for providing a path of the second column average signal between the average output node and the second storage unit based on a second column binning signal; a first binning result output unit suitable for outputting a first column storage signal stored in the first storage unit to a summation node based on a first row binning signal; a second binning result output unit suitable for outputting a second column storage signal stored in the second storage unit to the summation node based on a second row binning signal; an amplifying unit suitable for amplifying a sampling signal outputted from the summation node; and a feedback unit coupled between input and output terminals of the amplifying unit, suitable for adjusting a gain of the amplifying unit within a preset gain range.

The first and second binning result output units may simultaneously output the first and second column storage signals to the summation node in a binning mode. The first and second binning result output units may sequentially output the first and second column storage signals to the summation node in a normal mode.

The first column average signal may be generated by averaging the first unit pixel signal and the third unit pixel signal, and the second column average signal may be generated by averaging the second unit pixel signal and the fourth unit pixel signal.

The image sensing device may further include a third path unit suitable for providing a transmission path of the first and second pixel signals between the first column line and the first storage unit, in a normal mode; and a fourth path unit suitable for providing a transmission path of the third and fourth pixel signals between the second column line and the second storage unit, in the normal mode.

The first storage unit may store the first and second pixel signals transferred through the first column line based on the common storage control signal, and the second storage unit may store the third and fourth pixel signals transferred through the second column line based on the common storage control signal, in a normal mode.

In an exemplary embodiment, a method for operating an image sensing device may include performing a column binning on a plurality of unit pixel signals, which are sequentially outputted from first and second column lines, each coupled to a plurality of unit pixels, in a basis of rows in a binning mode, and storing first and second column storage signals; and performing a row binning on the first and second column storage signals in the binning mode and outputting a sampling signal.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. It is also noted that, in this specification, "connected/coupled" refers to one component not only directly coupling another component but also indirectly coupling another component through an intermediate component. In addition, a singular form may include a plural form as long as it is not specifically mentioned in a sentence.

Figure 1:
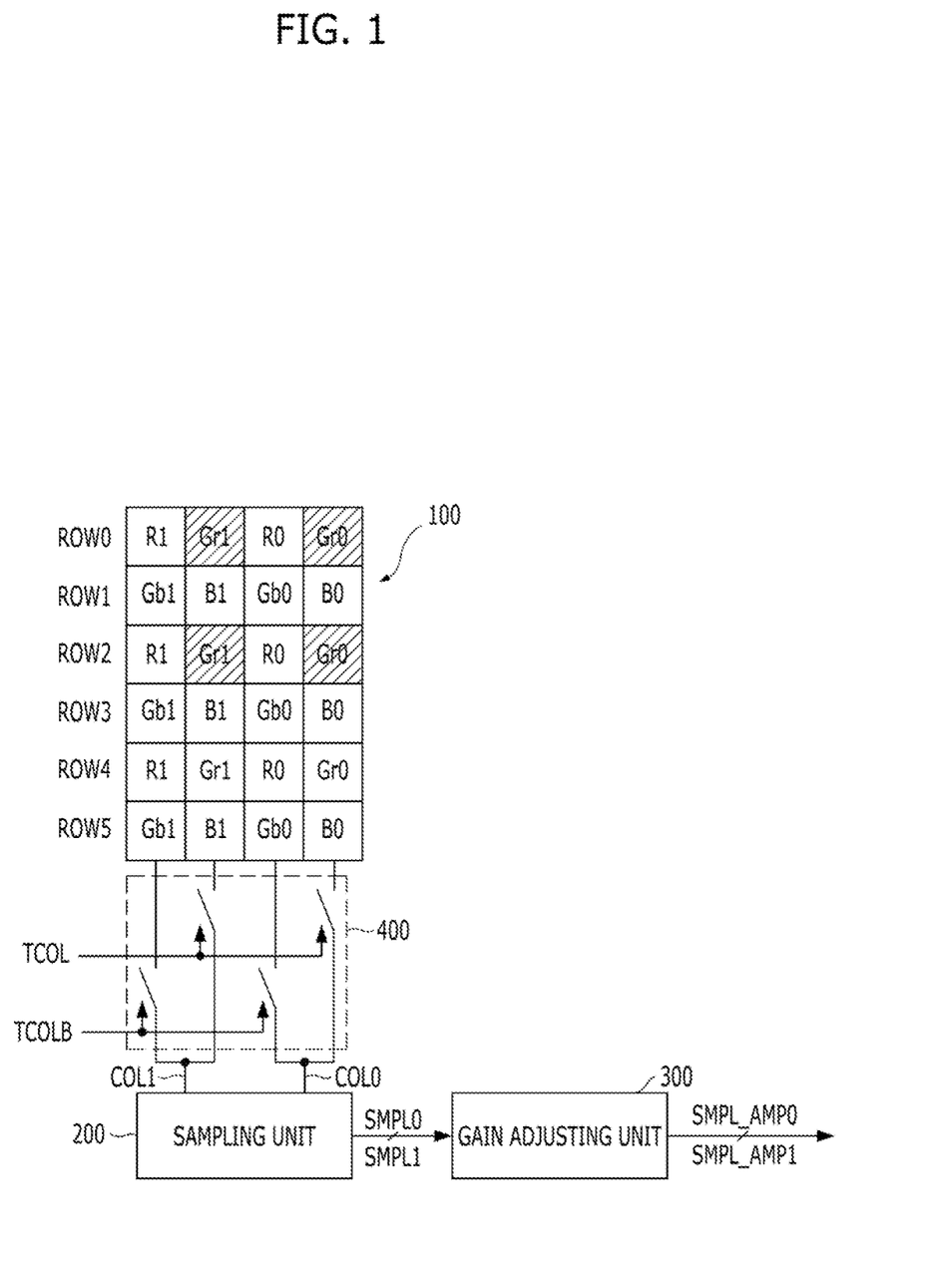
FIG. 1 is a block diagram of an image sensing device in accordance with an exemplary embodiment.

FIG. 1 is a block diagram of an image sensing device in accordance with an exemplary embodiment.

Referring to FIG. 1, the image sensing device includes a pixel array 100, a sampling unit 200, a gain adjusting unit 300, and a column control unit 400. The pixel array 100 includes a plurality of unit pixels, which are arranged in rows and columns. The column control unit 400 serves to selectively couple a plurality of column lines, each being coupled to a plurality of unit pixels arranged in a column direction, i.e., in an Y axis, to a plurality of common column lines COL0 and COL1 in response to a column control signal TCOL and TCOLB. The sampling unit 200 is coupled to the plurality of common column lines COL0 and COL1 and performs sampling of the plurality of unit pixels provided in the pixel array 100 in units of 2 by 2 in a binning mode. The gain adjusting unit 300 amplifies a sampling signal SMPL0 and SMPL1 which is sampled by the sampling unit 200.

Here, the pixel array 100 comprises the plurality of unit pixels, which are arranged in rows and columns. For example, a unit pixel of a green color (G) and a unit pixel of a blue color (B) are alternately arranged in an odd column while a unit pixel of a red color (R) and a unit pixel of a green color (G) are alternately arranged in an even column. Though a pixel array 100 arranged in 6 rows and 4 columns is illustrated in FIG. 1, it is not limited to the embodiments set forth herein.

The column control unit 400 serves to selectively couple two adjacent column lines to one of the common column lines COL0 and COL1. For example, the column control unit 400 couples first and second column lines to a first common column line COL0, and couples third and fourth column lines to a second common column line COL1 in response to the column control signal TCOL and TCOLB. Though 4 column lines and 2 common column lines are illustrated in FIG. 1, it is not limited to the embodiments set forth herein. In another embodiment, a plurality of column lines and a plurality of common column lines corresponding to half of the number of the column lines may be provided according to an arrange structure of the pixel array 100.

The sampling unit 200 performs a column binning twice in units of two unit pixels having the same color and performs a row binning based on a column binning result in the binning mode. For example, the sampling unit 200 performs a first column binning on two unit pixels Gr0 and Gr1, which are disposed in a first row ROW0 and coupled to the first and third column lines, respectively, and then performs a second column binning on two unit pixels Gr0 and Gr1, which are disposed in a third row ROW2 and coupled to the first and third column lines, respectively, and then performs a row binning on a first column binning result and a second column binning result. (Hereinafter, two unit pixels Gr0 and Gr1 disposed in the first row ROW0 are referred to as a 'first unit pixel' and a 'third unit pixel', respectively, and two unit pixels Gr0 and Gr1 disposed in the third row ROW2 are referred to as a 'second unit pixel' and a 'fourth unit pixel', respectively.) Meanwhile, the sampling unit 200 samples the plurality of unit pixels in a basis of rows and consecutively transfers a sampling result to the gain adjusting unit 300 in a basis of columns in a normal mode. The sampling unit 200 may comprise a Correlated-Double Sampling (CDS) circuit.

The gain adjusting unit 300 amplifies the sampling signal SMPL0 and SMPL1 within a preset gain range and outputs an amplifying signal SMPL_AMP0 and SMPL_AMP1. This is because the sampling signal SMPL0 and SMPL1 transferred from the sampling unit 200 is a result of the sum of two unit pixels.

Figure 2:
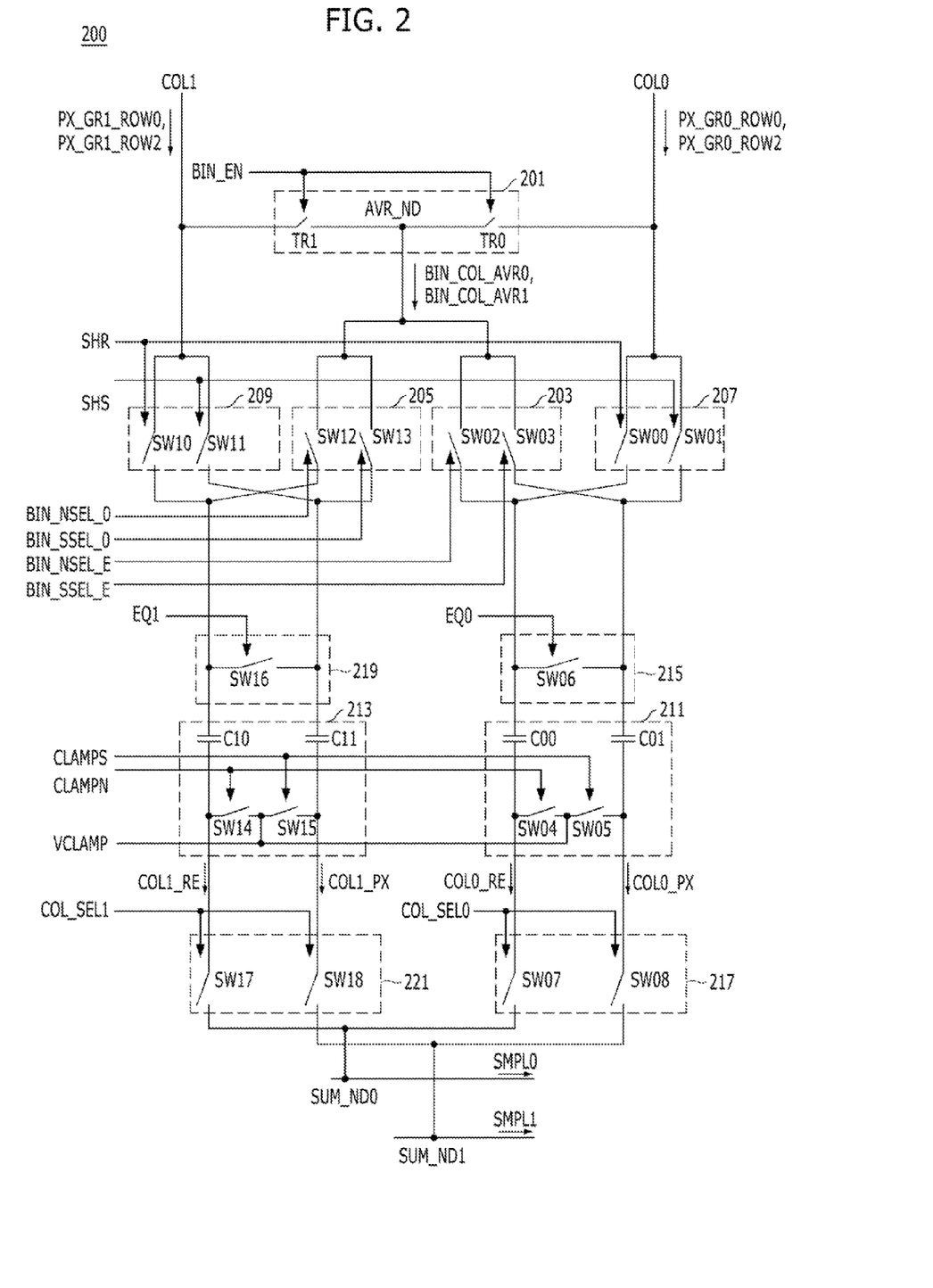
FIG. 2 is a circuit diagram of a sampling unit shown in FIG. 1 in accordance with an exemplary embodiment.

FIG. 2 is a circuit diagram of the sampling unit 200 shown in FIG. 1 in accordance with an exemplary embodiment. In FIG. 2, a part of the sampling unit 200, corresponding to the first and second common column lines COL0 and COL1, is illustrated.

Referring to FIG. 2, the sampling unit 200 includes a column binning unit 201, 203, 205, 211 and 213 and a row binning unit 215, 217, 219 and 221. The column binning unit 201, 203, 205, 211 and 213 performs a column binning on first and second unit pixel signals PX_GR0_ROW0 and PX_GR0_ROW2 and third and fourth unit pixel signals PX_GR1_ROW0 and PX_GR1_ROW2 in a basis of rows in the binning mode. The row binning unit 215, 217, 219 and 221 performs a row binning based on an output signal COL0_RE, COL0_PX, COL1_RE, and COL1_PX outputted from the column binning unit 201, 203, 205, 211 and 213 in the binning mode. Here, the first and second unit pixel signals PX_GR0_ROW0 and PX_GR0_ROW2 are signals of the first unit pixel Gr0 and the second unit pixel Gr0, which are sequentially outputted from the first common column line COL0, and the third and fourth unit pixel signals PX_GR1_ROW0 and PX_GR1_ROW2 are signals of the third unit pixel Gr1 and the fourth unit pixel Gr1, which are sequentially outputted from the second common column line COL1.

In detail, the column binning unit 201, 203, 205, 211 and 213 comprises a column average unit 201, a first path unit 203, a second path unit 205, a first storage unit 211 and a second storage unit 213. The column average unit 201 averages the first and second unit pixel signals PX_GR0_ROW0 and PX_GR0_ROW2, sequentially outputted from the first common column line COL0, and the third and fourth unit pixel signals PX_GR1_ROW0 and PX_GR1_ROW2, sequentially outputted from the second common column line COL1, in a basis of rows, and outputs a first column average signal BIN_COL_AVR0 by averaging the first unit pixel signal PX_GR0_ROW0 and the third unit pixel signal PX_GR1_ROW0 and also outputs a second column average signal BIN_COL_AVR1 by averaging the second unit pixel signal PX_GR0_ROW2 and the fourth unit pixel signal PX_GR1_ROW2 in the binning mode. The first storage unit 211 stores the first column average signal BIN_COL_AVR0, and the second storage unit 213 stores the second column average signal BIN_COL_AVR1 in the binning mode. The first path unit 203, coupled between the column average unit 201 and the first storage unit 211, provides a path therebetween in the binning mode. The second path unit 205, coupled between the column average unit 201 and the second storage unit 213, provides a path therebetween in the binning mode.

The column average unit 201 comprises a first resistance unit TR0 and a second resistance unit TR1. The first resistance unit TR0 is coupled between the first common column line COL0 and an average output node AVR_ND and reflects a preset resistance on the first and second unit pixel signals PX_GR0_ROW0 and PX_GR0_ROW2 in response to a binning enable signal BIN_EN. Here, the average output node AVR_ND is a node where the first and second column average signals BIN_COL_AVR0 and BIN_COL_AVR1 are sequentially outputted. The second resistance unit TR1 is coupled between the second common column line COL1 and the average output node AVR_ND and reflects a preset resistance on the third and fourth unit pixel signals PX_GR1_ROW0 and PX_GR1_ROW2 in response to the binning enable signal BIN_EN. Preferably, each of the first and second resistance units TR0 and TR1 may comprise a transistor, and a turn-on resistance is used as the preset resistance.

The first path unit 203 comprises first and second switching units SW02 and SW03 for selectively coupling the average output node AVR_ND to the first storage unit 211 in response to a first column binning signal BIN_NSEL_E and BIN_S-SEL_E. The first and second switching units SW02 and SW03 may be connected in parallel to the average output node AVR_ND because a unit pixel signal outputted from a unit pixel includes a reference signal and a data signal though both are not illustrated. For example, the first unit pixel signals PX_GR0_ROW0 includes a reference signal and a data signal, which are sequentially outputted. Thus, since the first column average signal BIN_COL_AVR0 outputted from the column average unit 201 also includes a reference signal and a data signal, the first path unit 203 requires the first switching unit SW02 to provide the reference signal of the first column average signal BIN_COL_AVR0 to the first storage unit 211 and the second switching unit. SW03 to provide the data signal of the first column average signal BIN_COL_AVR0 to the first storage unit 211.

The first storage unit 211 comprises first and second capacitors C00 and C01, and third and fourth switching units SW04 and SW05. The first and second capacitors C00 and C01 store the reference signal and the data signal of the first column average signal BIN_COL_AVR0, respectively. The third and fourth switching units SW04 and SW05 supply a given voltage VCLAMP to one terminal of the first and second capacitors C00 and C01 in response to first and second common storage control signals CLAMPN and CLAMPS, respectively. Here, the given voltage VCLAMP may have a voltage level sufficient to stably store the reference signal and the data signal of the first column average signal BIN_COL_AVR0 in the first and second capacitors C00 and C01.

Meanwhile, since circuit configurations of the second storage unit 213 and the second path unit 205 are substantially the same as those of the first storage unit 211 and the first path unit 203, their detailed description will be omitted for conciseness.

Subsequently, the row binning units 215, 217, 219 and 221 comprise a first binning result output unit 215 and 217 and a second binning result output unit 219 and 221. The first binning result output unit 215 and 217 outputs a first column storage signal COL0_RE and COL0_PX stored in the first storage unit 211 to first and second summation nodes SUM_ND0 and SUM_ND1 where the sampling signal SMPL0 and SMPL1 is outputted in response to a first row binning signal EQ0 and COL_SEL0. The second binning result output unit 219 and 221 outputs a second column storage signal COL1_RE and COL1_PX stored in the second storage unit 213 to the first and second summation nodes SUM_ND0 and SUM_ND1 in response to a second row binning signal EQ1 and COL_SEL1.

In detail, the first binning result output units 215 and 217 comprise a first equalization unit 215 and a first output unit 217. The first equalization unit 215 couples the other terminals of the first and second capacitors C00 and C01 to each other in response to a first equalization signal EQ0 of the first row binning signal EQ0 and COL_SEL0. The first output unit 217 outputs the first column storage signal COL0_RE and COL0_PX to the first and second summation nodes SUM_ND0 and SUM_ND1 in response to a first column output signal COL_SEL0 of the first row binning signal EQ0 and COL_SEL0. The first equalization unit 215 comprises a fifth switching unit SW06 coupled between the other terminals of the first and second capacitors C00 and C01. The first output unit 217 comprises a sixth switching unit SW07 and a seventh switching unit SW08. The sixth switching unit SW07 is coupled between one terminal of the first capacitor C00 and the first summation node SUM_ND0 to transfer a reference signal COL0_RE of the first column storage signal COL0_RE and COL0_PX to the first summation node SUM_ND0 in response to the first column output signal COL_SEL0. The seventh switching unit SW08 is coupled between one terminal of the second capacitor C01 and the second summation node SUM_ND1 to transfer a data signal COL0_PX of the first column storage signal COL0_RE and COL0_PX to the second summation node SUM_ND1 in response to the first column output signal COL_SEL0.

Meanwhile, since circuit configurations of the second binning result output units 219 and 221 are substantially the same as those of the first binning result output units 215 and 217, their detailed description will be omitted for conciseness.

In accordance with the exemplary embodiment, the first binning result output unit 215 and 217 and the second binning result output unit 219 and 221 simultaneously output the first and second column storage signals COL0_RE, COL0_PX, COL1_RE, and COL1_PX to the first and second summation nodes SUM_ND0 and SUM_ND1 in the binning mode, and sequentially output the first and second column storage signals COL0_RE, COL0_PX, COL1_RE, and COL1_PX to the first and second summation nodes SUM_ND0 and SUM_ND1 in the normal mode.

On the other hand, the sampling unit 200 further comprises a third path unit 207 and a fourth path unit 209. The third path unit 207 is coupled between the first common column line COL0 and the first storage unit 211 to provide a transmission path of the first and second unit pixel signals PX_GR0_ROW0 and PX_GR0_ROW2. The fourth path unit 209 is coupled between the second common column line COL1 and the second storage unit 213 to provide a transmission path of the third and fourth unit pixel signals PX_GR1_ROW0 and PX_GR1_ROW2. Since circuit configurations of the third path unit 207 and the fourth path unit 209 are substantially the same as that of the first path unit 203 except when determining whether to provide a path in response to first and second column normal signals SHR and SHS in the normal mode, their detailed description will be omitted for conciseness.

Figure 3:
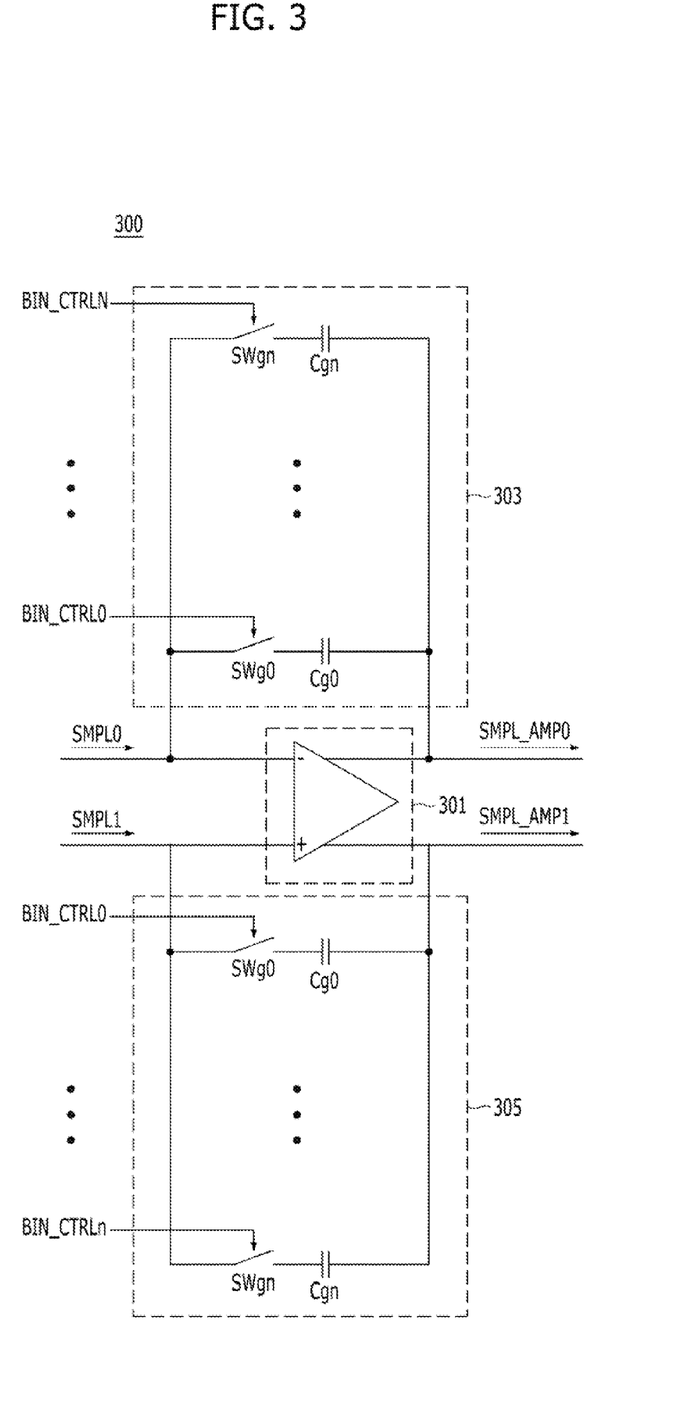
FIG. 3 is a circuit diagram of a gain adjusting unit shown in FIG. 1 in accordance with an exemplary embodiment.

FIG. 3 is a circuit diagram of the gain adjusting unit 300 shown in FIG. 1 in accordance with an exemplary embodiment.

Referring to FIG. 3, the gain adjusting unit 300 comprises an amplifying unit 301 and a feedback unit 303 and 305. The amplifying unit 301 amplifies the sampling signal SMPL0 and SMPL1 outputted through the first and second summation nodes SUM_ND0 and SUM_ND1, and outputs the amplifying signal SMPL_AMP0 and SMPL_AMP1. The feedback unit 303 and 305 is coupled between input and output terminals of the amplifying unit 301 to adjust a gain of the amplifying unit 301 in response to a plurality of gain control signals BIN_CTRL0 to BIN_CTRLN. Here, the amplifying unit 301 comprises a differential amplifier to differentially amplify a reference signal and a data signal of the sampling signal SMPL0 and SMPL1 applied through the first and second summation nodes SUM_ND0 and SUM_ND1. The feedback units 303 and 305 comprise of at least one unit feedback element coupled between the input and output terminals of the amplifying unit 301, which includes a switch SWG0 to SWGN and a capacitor CG0 to CGN coupled in series.

Hereinafter, referring to FIGS. 4 and 5, an operation of the image sensing device in accordance with the exemplary embodiment is described in detail.

Figure 4:
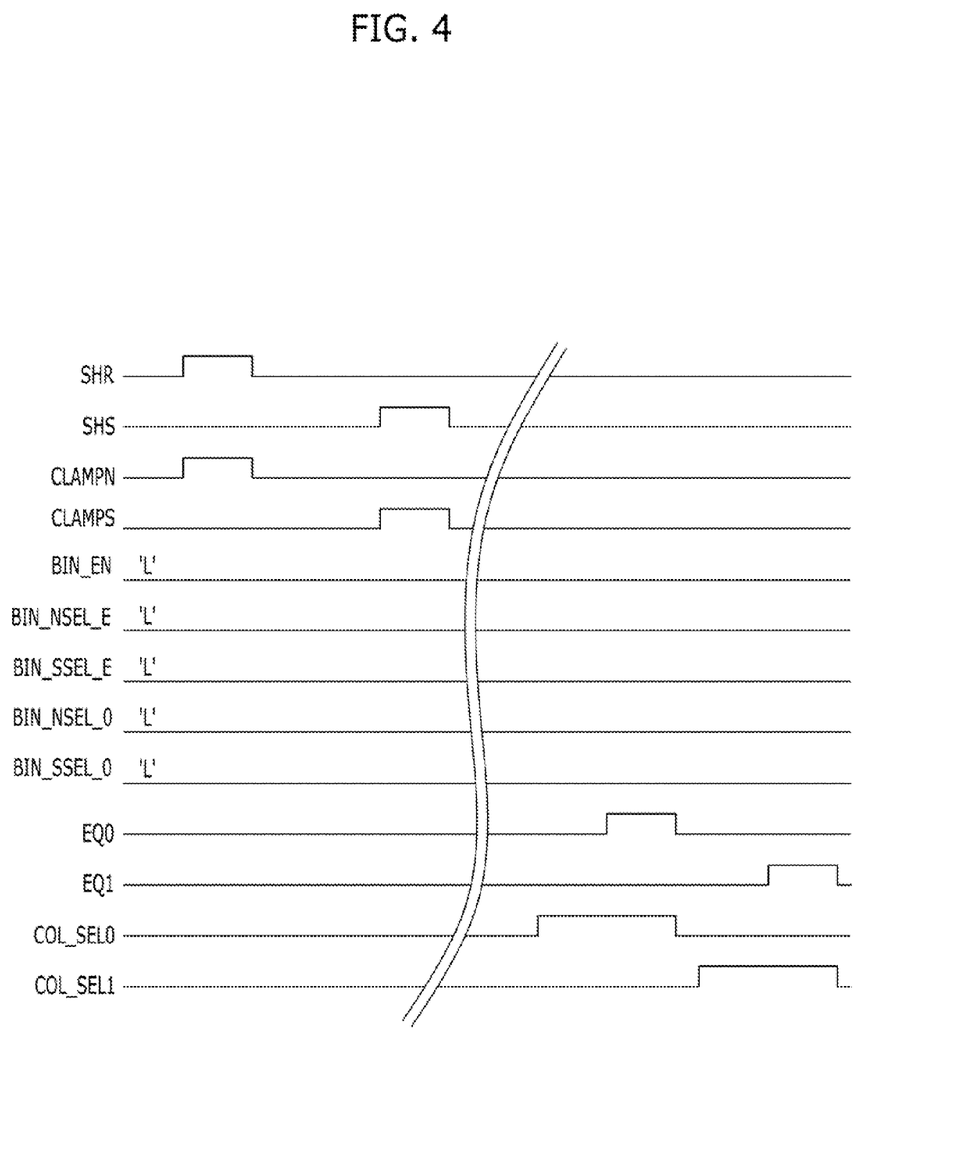
FIGS. 4 and 5 are timing diagrams explaining an operation of an image sensing device in accordance with an exemplary embodiment.
Figure 5:
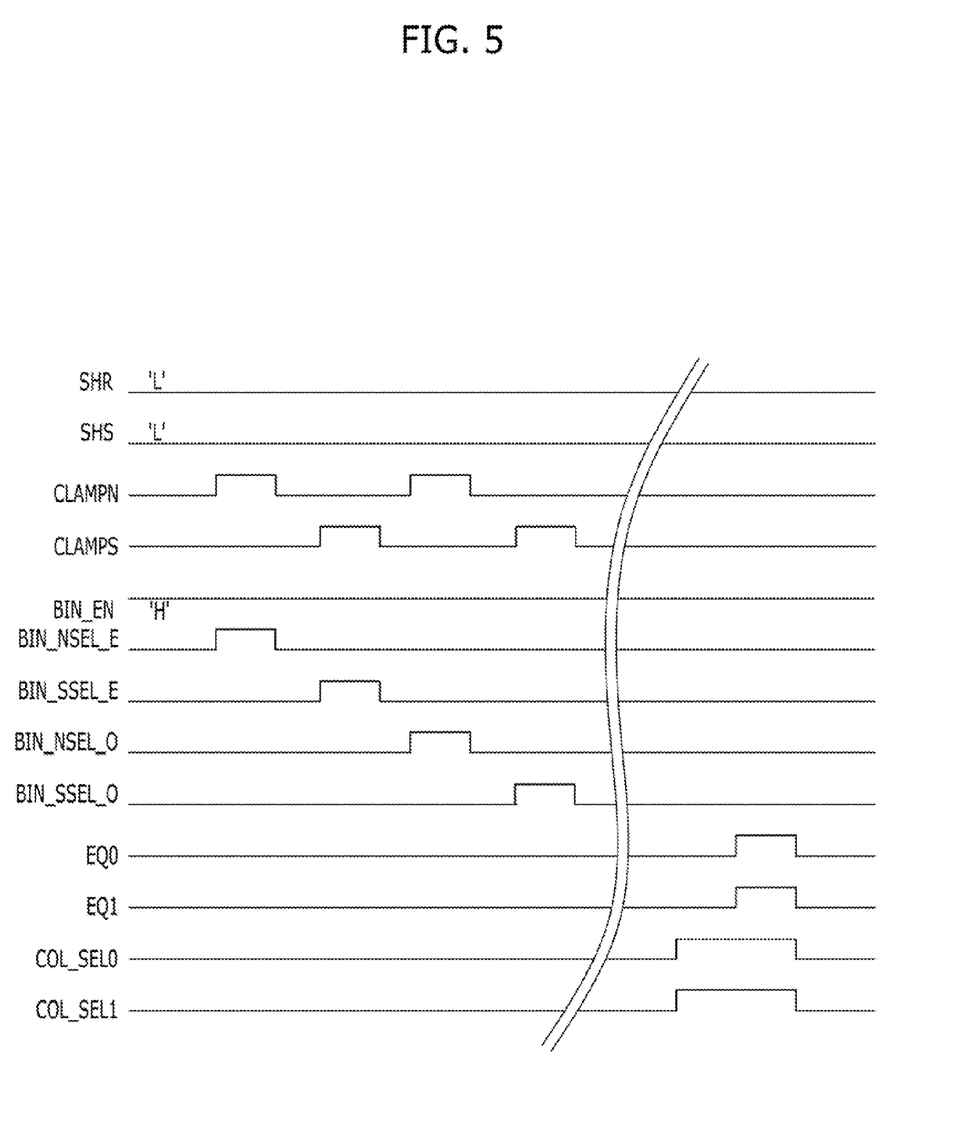

FIGS. 4 and 5 are timing diagrams explaining an operation of the image sensing device in accordance with the exemplary embodiment. A timing diagram explaining an operation of the image sensing device in the normal mode is shown in FIG. 4 and a timing diagram explaining an operation of the image sensing device in the binning mode is shown in FIG. 5.

First, the operation of the image sensing device in the normal mode is explained. It is assumed that the first unit pixel Gr0 and the third unit pixel Gr1 among a plurality of pixels arranged in the first row ROW0 are sampled.

In the normal mode, the sampling unit 200 stores the first and third unit pixel signals PX_GR0_ROW0 and PX_GR1_ROW0, which are transferred through the first common column line COL0 and the second common column line COL1, respectively, in the first storage unit 211 and the second storage unit 213, respectively, and sequentially outputs the first column storage signal COL0_RE and COL0_PX and the second column storage signal COL1_RE and COL1_PX, which are stored in the first storage unit 211 and the second storage unit 213, respectively, to the gain adjusting unit 300.

In detail, referring to FIG. 4, an operation of the sampling unit 200 in the normal mode is explained in detail.

Referring to FIG. 4, the third path unit 207 provides a path between the first common column line COL0 and the first storage unit 211 in response to the first and second column normal signals SHR and SHS for the first unit pixel signal PX_GR0_ROW0. The fourth path unit 209 provides a path between the second common column line COL1 and the second storage unit 213 in response to the first and second column normal signals SHR and SHS for the third unit pixel signal PX_GR1_ROW0. At this time, since the binning enable signal BIN_EN, the first column binning signal BIN_NSEL_E and BIN_SSEL_E, and the second column binning signal BIN_NSEL_O and BIN_SSEL_O are deactivated to a logic low level, the column average unit 201, and the first and second path units 203 and 205 are disabled.

Here, though not illustrated, each of the first unit pixel signal PX_GR0_ROW0 and the third unit pixel signal PX_GR1_ROW0 comprises a reference signal and a data signal. In other words, the first unit pixel Gr0 sequentially outputs a reference signal and a data signal corresponding to the first unit pixel signal PX_GR0_ROW0 to the first common column line COL0, and the third unit pixel Gr1 sequentially outputs a reference signal and a data signal corresponding to the third unit pixel signal PX_GR1_ROW0 to the second common column line COL1.

Accordingly, the third and fourth path units 207 and 209 transfer the respective reference signal of the first unit pixel signal PX_GR0_ROW0 and the third unit pixel signal PX_GR1_ROW0 to the first and second storage units 211 and 213 in response to the first column normal signal SHR, and then transfer the respective data signal in the first unit pixel signal PX_GR0_ROW0 and the third unit pixel signal PX_GR1_ROW0 to the first and second storage units 211 and 213 in response to the second column normal signal SHS. At this time, since the first and second equalization signals EQ0 and EQ1 are deactivated, the first and second equalization units 215 and 219 are disabled.

The first storage unit 211 and the second storage unit 213 store the respective reference signal of the first unit pixel signal PX_GR0_ROW0 and the third unit pixel signal PX_GR1_ROW0 in the respective capacitor C00 and C10 of the capacitors C00, C01, C10 and C11. Then, the first storage unit 211 and the second storage unit 213 store the respective data signal of the first unit pixel signal PX_GR0_ROW0 and the third unit pixel signal PX_GR1_ROW0 in the respective capacitor C01 and C11 of the capacitors C00, C01, C10 and C11. At this time, since the first and second common storage control signals CLAMPN and CLAMPS are activated for a duration substantially the same as an activation duration of the first and second column normal signals SHR and SHS, the first unit pixel signal PX_GR0_ROW0 and the third unit pixel signal PX_GR1_ROW0 may be stably stored in the first storage unit 211 and the second storage unit 213, respectively.

Subsequently, when the first equalization signal EQ0 is activated in a state that the first column output signal COL_SEL0 is activated in advance, the first column storage signal COL0_RE and COL0_PX stored in the first storage unit 211 is transferred to the first and second summation nodes SUM_ND0 and SUM_ND1. In detail, the first equalization unit 215 electrically couples the other terminals of the first and second capacitors C00 and C01 to each other in response to the first equalization signal EQ0 in a state that the first output unit 217 couples one terminal of the first capacitor C00 to the first summation node SUM_ND0, and couples one terminal of the second capacitor C01 to the second summation node SUM_ND1 in response to the first column output signal COL_SEL0. Then, the reference signal COL0_RE of the first column storage signal COL0_RE and COL0_PX is transferred to the first summation node SUM_ND0, and the data signal COL0_PX of the first column storage signal COL0_RE and COL0_PX is transferred to the second summation node SUM_ND1.

Subsequently, when the second equalization signal EQ1 is activated in a state that the second column output signal COL_SEL1 is activated, the second column storage signal COL1_RE and COL1_PX stored in the second storage unit 213 is transferred to the first and second summation nodes SUM_ND0 and SUM_ND1. In detail, the second equalization unit 219 electrically couples the other terminals of the third and fourth capacitors C10 and C11 to each other in response to the second equalization signal EQ1 in a state that the second output unit 221 couples one terminal of the third capacitor C10 to the first summation node SUM_ND0, and couples one terminal of the fourth capacitor C11 to the second summation node SUM_ND1 in response to the second column output signal COL_SEL1. Then, the reference signal COL1_RE of the second column storage signal COL1_RE and COL1_PX is transferred to the first summation node SUM_ND0 and the data signal COL1_PX of the second column storage signal COL1_RE and COL1_PX is transferred to the second summation node SUM_ND1.

Meanwhile, the gain adjusting unit 300 amplifies the sampling signal SMPL0 and SMPL1 transferred through the first and second summation nodes SUM_ND0 and SUM_ND1. For example, the gain adjusting unit 300 amplifies the sampling signal SMPL0 and SMPL1 by one fold. At this time, the sampling signal SMPL0 and SMPL1, corresponding to the first column storage signal COL0_RE and COL0_PX, and the sampling signal SMPL0 and SMPL1, corresponding to second column storage signal COL1_RE and COL1_PX, are sequentially inputted to the gain adjusting unit 300.

Next, the operation of the image sensing device in the binning mode is explained. It is assumed that the pixel array 100 is sampled in a unit of 2 by 2 and 4 unit pixels having the same color among a plurality of pixels arranged in the first row ROW0 and the third row ROW2, i.e., shaded pixels in FIG. 1.

In the binning mode, the sampling unit 200 performs a sampling operation through 1) a column binning twice on the first and second unit pixel signals PX_GR0_ROW0 and PX_GR0_ROW2 sequentially transferred through the first common column line COL0, and the third and fourth unit pixel signals PX_GR1_ROW0 and PX_GR1_ROW2 sequentially transferred through the second common column line COL1 in a basis of rows; and 2) a row binning based on a column binning result.

In detail, referring to FIG. 5, an operation of the sampling unit 200 in the binning mode is explained in detail.

Referring to FIG. 5, as the binning enable signal BIN_EN is activated, the column average unit 201 averages the first and second unit pixel signals PX_GR0_ROW0 and PX_GR0_ROW2 sequentially outputted from the first common column line COL0, and the third and fourth unit pixel signals PX_GR1_ROW0 and PX_GR1_ROW2 sequentially outputted from the second common column line COL1 in a basis of rows, and outputs the first and second column average signals BIN_COL_AVR0 and BIN_COL_AVR1 to the average output node AVR_ND. In other words, the column average unit 201 sequentially outputs the first column average signal BIN_COL_AVR0 by averaging the first unit pixel signal PX_GR0_ROW0 and the third unit pixel signal PX_GR1_ROW0, and outputs the second column average signal BIN_COL_AVR1 by averaging the second unit pixel signal PX_GR0_ROW2 and the fourth unit pixel signal PX_GR1_ROW2 to the average output node AVR_ND.

Subsequently, the first path unit 203 is coupled between the average output node AVR_ND and the first storage unit 211 to provide a path therebetween in response to the first column binning signal BIN_NSEL_E and BIN_SSEL_E. The second path unit 205 is coupled between the average output node AVR_ND and the second storage unit 213 to provide a path therebetween in response to the second column binning signal BIN_NSEL_O and BIN_SSEL_O. At this time, since the first and second column normal signals SHR and SHS are deactivated to a logic low level, the third and fourth path units 207 and 209 are disabled.

Here, though not illustrated, each of the first and second column average signals BIN_COL_AVR0 and BIN_COL_AVR1 comprises a reference signal and a data signal. For example, the first column average signal BIN_COL_AVR0 includes a reference signal generated by averaging the reference signals of the first unit pixel signal PX_GR0_ROW0 and the third unit pixel signal PX_GR1_ROW0, a data signal generated by averaging the data signals of the first unit pixel signal PX_GR0_ROW0 and the third unit pixel signal PX_GR1_ROW0. The reference signal and the data signal of the first column average signal BIN_COL_AVR0 are sequentially outputted to the average output node AVR_ND. Likewise, the second column average signal BIN_COL_AVR1 includes a reference signal generated by averaging the reference signals of the second unit pixel signal PX_GR0_ROW2 and the fourth unit pixel signal PX_GR1_ROW2, a data signal generated by averaging the data signals of the second unit pixel signal PX_GR0_ROW2 and the fourth unit pixel signal PX_GR1_ROW2. The reference signal and the data signal of the second column average signal BIN_COL_AVR1 are sequentially outputted to the average output node AVR_ND.

The first path unit 203 transfers the first column average signal BIN_COL_AVR0 to the first storage unit 211 in response to the first column binning signal BIN_NSEL_E and BIN_SSEL_E, and the second path unit 205 transfers the second column average signal BIN_COL_AVR1 to the second storage unit 213 in response to the second column binning signal BIN_NSEL_O and BIN_SSEL_O. In detail the first path unit 203 sequentially outputs the reference signal and the data signal included in the first column average signal BIN_COL_AVR0 to the first storage unit 211 in response to the first column binning signal BIN_NSEL_E and BIN_SSEL_E, and the second path unit 205 sequentially outputs the reference signal and the data signal included in the second column average signal BIN_COL_AVR1 to the second storage unit 213 in response to the second column binning signal BIN_NSEL_O and BIN_SSEL_O. At this time, since the first and second equalization signals EQ0 and EQ1 are deactivated, the first and second equalization units 215 and 219 are disabled.

The first storage unit 211 and the second storage unit 213 sequentially store the first and second column average signals BIN_COL_AVR0 and BIN_COL_AVR1 in response to the first and second common storage control signals CLAMPN and CLAMPS. In detail, the first storage unit 211 stores the reference signal of the first column average signal BIN_COL_AVR0 to the first capacitor C00 in response to the first common storage control signal CLAMPN and stores the data signal the first column average signal BIN_COL_AVR0 to the second capacitor C01 in response to the second common storage control signal CLAMPS. The second storage unit 213 stores the reference signal of the second column average signal BIN_COL_AVR1 to the third capacitor C10 in response to the first common storage control signal CLAMPN and stores the data signal of the second column average signal BIN_COL_AVR1 to the fourth capacitor C11 in response to the second common storage control signal CLAMPS.

Thereafter, when the first and second equalization signals EQ0 and EQ1 are activated in a state that the first and second column output signals COL_SEL0 and COL_SEL1 are activated in advance, the first column storage signal COL0_RE and COL0_PX stored in the first storage unit 211, and the second column storage signal COL1_RE and COL1_PX stored in the second storage unit 213 are transferred to the first and second summation nodes SUM_ND0 and SUM_ND1 at the same time. That is, the reference signal COL0_RE included in the first column storage signal COL0_RE and COL0_PX and the reference signal COL1_RE included in the second column storage signal COL1_RE and COL1_PX are simultaneously outputted to the first summation node SUM_ND0, and the data signal COL0_PX included in the first column storage signal COL0_RE and COL0_PX and the data signal COL1_PX included in the second column storage signal COL1_RE and COL1_PX are simultaneously outputted to the second summation node SUM_ND1.

To sum up, a first column binning result in units of 1 by 2 may be obtained by a process of averaging the first and third unit pixel signals PX_GR0_ROW0 and PX_GR1_ROW0, a second column binning result in units of 1 by 2 may be obtained by a process of averaging the second and fourth unit pixel signals PX_GR0_ROW2 and PX_GR1_ROW2, and a row binning result in units of 2 by 2 may be obtained by using the first and second column binning results.

Meanwhile, the gain adjusting unit 300 amplifies the sampling signal SMPL0 and SMPL1 transferred through the first and second summation nodes SUM_ND0 and SUM_ND1. For example, the gain adjusting unit 300 amplifies the sampling signal SMPL0 and SMPL1 by one fold and outputs the amplifying signal SMPL_AMP0 and SMPL_AMP1 in response to the gain control signals BIN_CTRL0 to BIN_C-TRLN.

According to the exemplary embodiment, circuits used in a normal mode, i.e., the first and second storage units 211 and 213, are also used in a binning mode. Accordingly, an area of an additional circuit for the binning mode may be minimized.

Although various embodiments have been described for illustrative purposes, it will be apparent to those skilled in the art that various changes and modifications may be made without departing from the spirit and scope of the invention as defined in the following claims.

For example, while it exemplarily was described in the exemplary embodiments that a plurality of unit pixels provided in a pixel array are sampled in units of 2 by 2 in a binning mode, the present invention is not necessarily limited to this and may be applied to a case where unit pixels are sampled in three or more units.

Further, while it exemplarily was described in the exemplary embodiments that a sampling unit includes a Correlated Double Sampling (CDS) circuit, the present invention is not necessarily limited to this and may be applied to a CDS circuit having another structure.

What is claimed is:

1. An image sensing device comprising:
first and second common column lines, each coupled to a plurality of unit pixels;
a column binning unit suitable for performing a column binning on a plurality of unit pixel signals, which are sequentially outputted from the first and second column lines, in a basis of rows in a binning mode; and
a row binning unit suitable for performing a row binning on a plurality of column binning signals outputted from the column binning unit in the binning mode,
wherein the first common column line is commonly coupled to first and second column lines, and the second common column line is commonly coupled to third and fourth column lines.

2. An image sensing device comprising:
a first column line coupled to a first unit pixel arranged in a first row, and a second unit pixel arranged in a second row;
a second column line coupled to a third unit pixel arranged in the first row, and a fourth unit pixel arranged in the second row;
a column average unit suitable for averaging first and second unit pixel signals sequentially outputted from the first column line, and third and fourth unit pixel signals sequentially outputted from the second column line, in a basis of rows, and outputting first and second column average signal, in a binning mode;
first and second storage units suitable for storing the first and second column average signals, respectively, in the binning mode;
a row binning unit suitable for summing first and second column storage signals stored in the first and second storage units, and outputting a sampling signal, in the binning mode; and
a gain adjusting unit suitable for amplifying the sampling signal within a preset gain range.

3. The image sensing device of claim 2, wherein the column average unit comprises:
a first resistance unit coupled between the first column line and an average output node where the first and second column average signals are outputted suitable for reflecting a preset resistance on the first and second unit pixel signals based on a binning enable signal; and
a second resistance unit coupled between the second column line and the average output node suitable for reflecting a preset resistance on the third and fourth unit pixel signals based on the binning enable signal.

4. The image sensing device of claim 2, wherein the row binning unit comprises:
a first binning result output unit suitable for outputting the first column storage signal stored in the first storage unit as the sampling signal to a summation node where the sampling signal is outputted, based on a first row binning signal; and
a second binning result output unit suitable for outputting the second column storage signal stored in the second storage unit as the sampling signal to the summation node based on a second row binning signal,
wherein the first and second binning result output units simultaneously output the first and second column storage signals to the summation node, in the binning mode.

5. The image sensing device of claim 4, wherein the first storage unit stores pixel signals transferred through the first column line, and the second storage unit stores pixel signals transferred through the second column line, in a normal mode.

6. The image sensing device of claim 5, wherein the first and second binning result output units sequentially output the first and second column storage signals to the summation node in the normal mode.

7. The image sensing device of claim 5, further comprising:
a third path unit suitable for providing a transmission path of the pixel signals between the first column line and the first storage unit, in the normal mode; and
a fourth path unit providing a transmission path of the pixel signals between the second column line and the second storage unit, in the normal mode.

8. The image sensing device of claim 5, wherein the gain adjusting unit comprises:
an amplifying unit suitable for amplifying the sampling signal; and
a feedback unit coupled between input and output terminals of the amplifying unit suitable for adjusting a gain of the amplifying unit within the preset gain range.

9. The image sensing device of claim 2, further comprising:
a first path unit suitable for providing a path between the column average unit and the first storage unit in the binning mode; and
a second path unit suitable for providing a path between the column average unit and the second storage unit in the binning mode.

10. A method for operating an image sensing device, the method comprising:
performing a column binning on a plurality of unit pixel signals, which are sequentially outputted from first and second column lines, each coupled to a plurality of unit pixels, in a basis of rows in a binning mode, and storing first and second column storage signals; and
performing a row binning on the first and second column storage signals in the binning mode, and outputting a sampling signal,
wherein the performing a row binning comprises summing the first and second column storage signals.

11. The method of claim 10, wherein the performing a column binning comprises:
averaging first and second unit pixel signals which are sequentially outputted from the first column line coupled to a first unit pixel arranged in a first row and a second unit pixel arranged in a second row, and third and fourth unit pixel signals which are sequentially outputted from the second column line coupled to a third unit pixel arranged in the first row and a fourth unit pixel arranged in the second row, in a basis of rows, and outputting first and second column average signal, in the binning mode; and
storing the first and second column average signals as the first and second column storage signals, respectively, in the binning mode.

12. The method of claim 10, wherein the performing a row binning comprises:
outputting the first column storage signal as the sampling signal; and
outputting the second column storage signal as the sampling signal,
wherein the first and second column storage signals are simultaneously outputted to the summation node, in the binning mode.

13. The method of claim 10, further comprising:
storing pixel signals sequentially outputted from the first and second column lines as the first and second column storage signals in a normal mode; and
sequentially outputting the first and second column storage signals in the normal mode.

14. The method of claim 10, further comprising:
amplifying the sampling signal within a preset gain range.

* * * * *